UNITED STATES PATENT OFFICE.

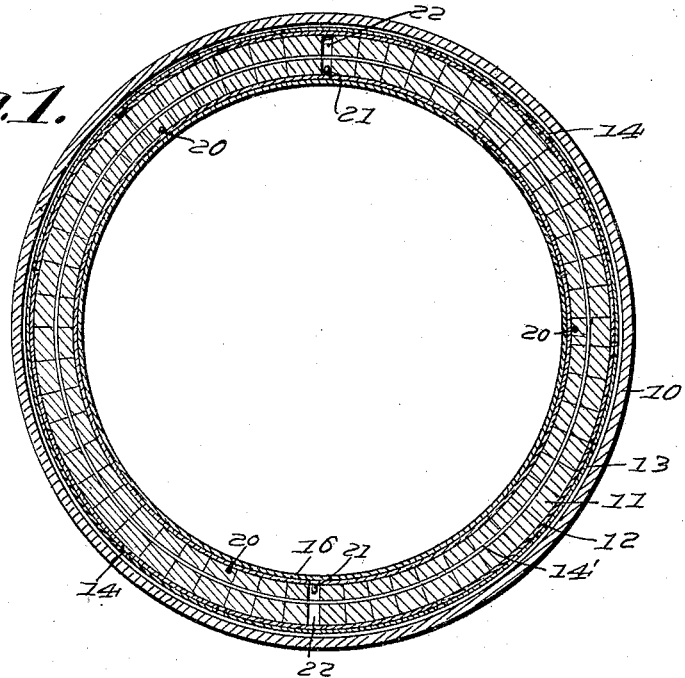
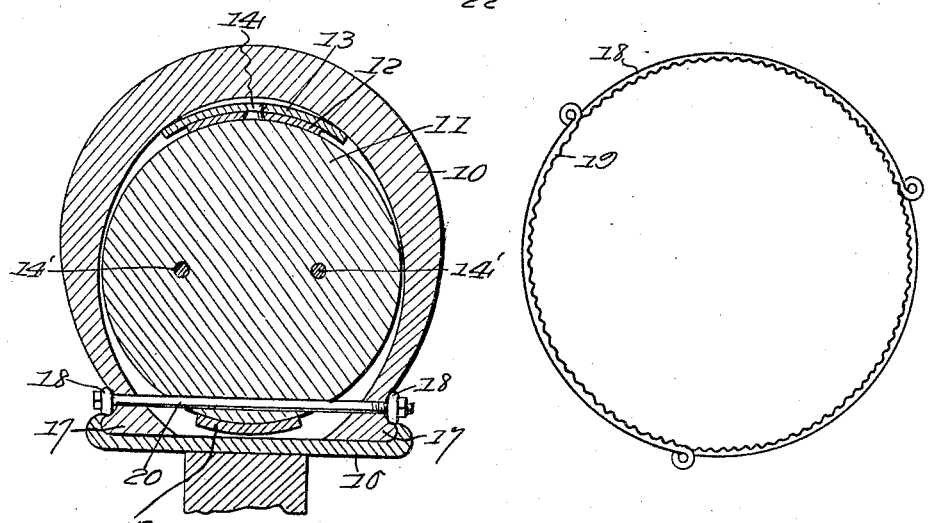

VINCENT NAVE, OF PROVIDENCE, RHODE ISLAND.

TIRE.

1,427,622.  Specification of Letters Patent.  Patented Aug. 29, 1922.

Application filed June 9, 1920. Serial No. 387,569.

*To all whom it may concern:*

Be it known that I, VINCENT NAVE, a subject of the King of Italy, residing at Providence, in the county of Providence and State of Rhode Island, have invented new and useful Improvements in Tires, of which the following is a specification.

The object of the invention is to provide a tire construction by which the disadvantages of the pneumatic or inflatable tube as a filler for the casing or shoe, may be avoided without detracting essentially from the resilience of the tire, and without adding to the expense either of the construction or of maintenance of tires suitable for vehicles of the motor driven type, and with these objects in view, the invention consists in a construction and combination of parts, of which a preferred embodiment is shown in the accompanying drawings, wherein:

Figure 1 is a longitudinal sectional view of a tire embodying the invention.

Figure 2 is a transverse sectional view.

Figure 3 is an elevational view of one of the retaining rings.

Within a casing or shoe 10 which may be of any preferred or desired construction, and contour, for example of the clincher or other type, there is arranged a filler consisting of a series of blocks or sections 11 of cork arranged in end to end relation and secured by glue or cement to an encircling peripheral strap 12 carrying a metallic band 13 which may be secured thereto by rivets 14 or the equivalents thereof, said filler blocks or elements being threaded upon metallic rings 14' disposed in side by side relation in parallelism with the series of filler elements to maintain the latter in proper co-operative relation.

Also disposed at the inner surfaces of the filler blocks or sections there is arranged a concentric band 15 of copper or equivalent frictional material for contact with the rim 16 of the wheel to minimize the tendency of the filler to creep upon the rim while engaged at either side with the lips or beads 17 of the casing are the clamping bands 18 serrated or toothed as indicated at 19 to engage the casing and contact it transversely of the filler by means of bolts 20.

Anchoring or staying studs or pins 21 may also be extended outwardly through the rim to engage the socket 22 in the filler to prevent creeping of the tire upon the wheel rim.

The yieldability or cushioning quality of the cork serves to impart to the tire the desired resilience which is sought in the use of a pneumatic or cushion tire, while obviously the penetration of the same by tacks or nails is not open to the disadvantages resulting from the use of a pneumatic or inflatable tube, and in addition the metallic band which encircles the filler and is interposed between the latter and the tread of the casing or shoe serves to prevent the penetration of sharp objects and to prolong the integrity of the filler.

The invention having been described, what is claimed as new and useful is:—

The combination with a tire rim and outer casing, of a filler disposed within the casing, a frictional band engaging the inner surface of the filler and disposed in surrounding relation to the rim, clamping bands disposed against the outer faces of the casing adjacent the rim, and transverse bolts connecting the clamping bands on opposite sides of the outer casing, the said bolts passing through the casing, and through the filler just above the plane of the frictional band.

In testimony whereof he affixes his signature.

VINCENT NAVE.